United States Patent [19]

Lundberg et al.

[11] Patent Number: 4,469,994
[45] Date of Patent: Sep. 4, 1984

[54] REFERENCE SIGNAL CIRCUIT

[75] Inventors: Richard E. Lundberg, Ashby; Bartholomew D. Murphy, Lincoln, both of Mass.

[73] Assignee: General Electric Company, Lynn, Mass.

[21] Appl. No.: 483,813

[22] Filed: Apr. 11, 1983

[51] Int. Cl.³ .............................................. G05B 11/18
[52] U.S. Cl. ..................................... 318/591; 318/603; 364/181
[58] Field of Search .................... 364/181, 187; 377/2; 318/591, 590, 603, 626

[56] References Cited

U.S. PATENT DOCUMENTS

| | | | |
|---|---|---|---|
| 3,940,593 | 2/1976 | Bleak et al. .......................... | 364/181 |
| 3,969,619 | 7/1976 | Ramly et al. ................... | 318/591 X |
| 4,025,762 | 5/1977 | Rossi et al. ........................ | 235/150.1 |
| 4,035,620 | 7/1977 | Hobbs et al. ..................... | 318/591 X |
| 4,141,065 | 2/1979 | Sumi et al. ....................... | 318/591 X |
| 4,227,072 | 10/1980 | Fancy et al. ........................... | 235/92 |

Primary Examiner—B. Dobeck
Attorney, Agent, or Firm—James W. Mitchell

[57] ABSTRACT

In the control of prime movers, automatic and manually generated input signals should be able to be entered into the control system without undue control disturbance or perturbation. Likewise should an automatic signal fail, the switch to a last valid signal prior to entry into a manual mode is also desirable. An analog-digital hybrid circuit is described which includes a memory, storage, timing and manual input portions as well as certain select A or B circuits which allow for bumpless transfer between automatic manual and memory modes of operation.

9 Claims, 1 Drawing Figure

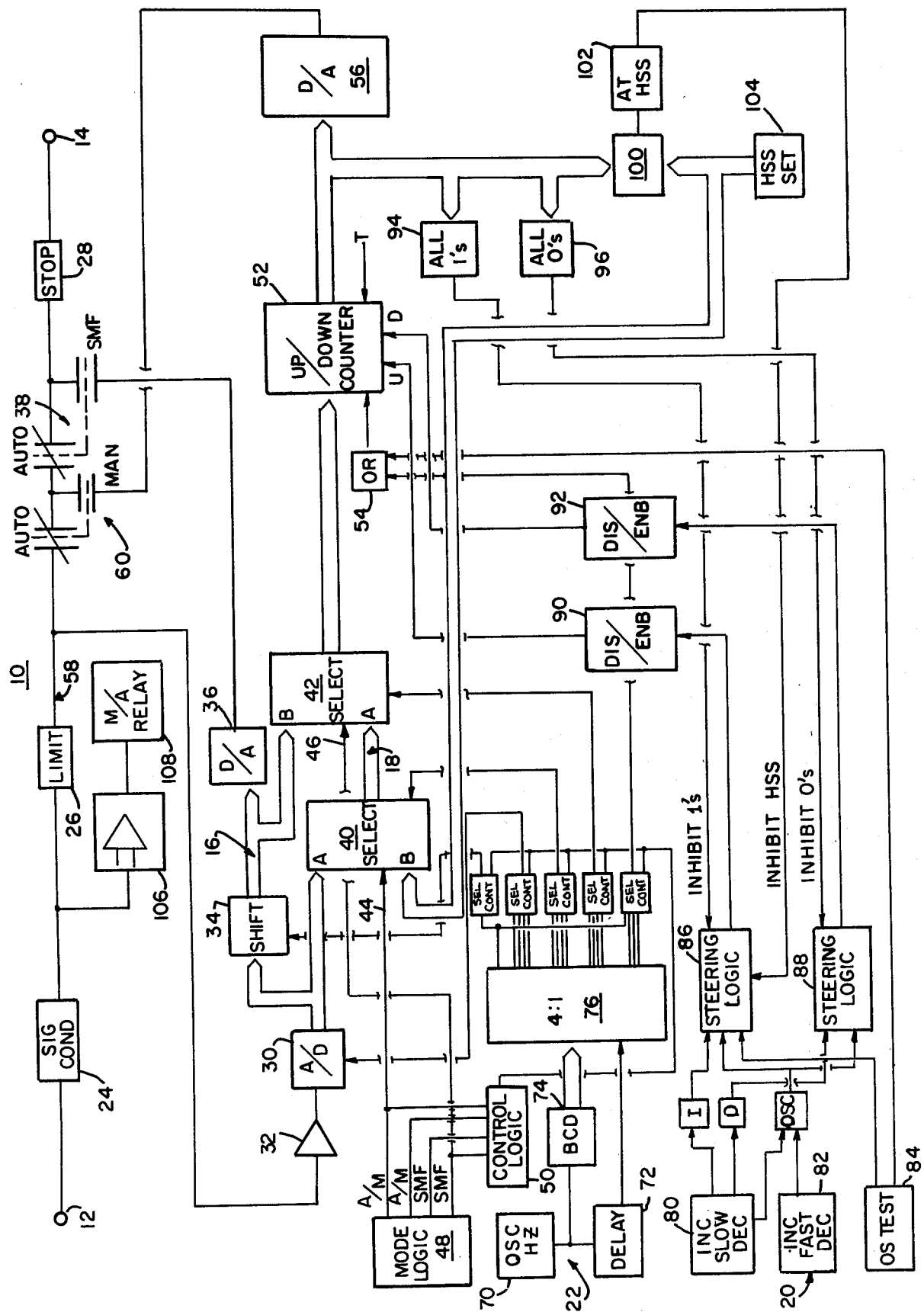

REFERENCE SIGNAL CIRCUIT

BACKGROUND OF THE INVENTION

This invention relates in general to control systems for prime movers and in particular to a reference signal circuit whereby bumpless transfer between automatic, manual and memory modes of operation is provided.

Computer automated control is rapidly becoming the preferred mode of operation for prime movers such as steam turbines employed in power generating stations and industrial installations. Despite a growing trend toward automation and the inherent reliability of computers, it is still mandatory to retain a manual control for the prime mover particularly in the event of emergencies and other unique situations. In addition, it is desirable to provide automatic to manual transfer in either a planned or emergency situation without undue disruption of the control system. Likewise, manual to automatic transfer should also be provided in a so-called "bumpless" manner. Finally, it is desirable to provide a temporary last valid signal memory function should the automatic input signal to the control system fail.

U.S. Pat. No. 4,025,762 issued May 24, 1977 to Rossi and Behringer and assigned to the assignee of the present invention shows circuitry for retaining a last valid automatic input signal prior to transfer to a manual mode. "Bumpless" transfer into the manual mode is accomplished by aligning the manual signal input to match the last valid automatic signal. The present invention improves upon the state of the art by providing an automatic tracking circuit which obviates the process of initializing the manual control to the automatic control prior to transfer.

U.S. Pat. No. 4,227,072 issued Oct. 7, 1980 to Fancy and Behringer and assigned to the assignee of the present invention shows a reference signal circuit which provides for either local or remote manual input into a signal reference circuit. The patent teaches the details of manual pushbutton input and priority for a prime mover control. The present invention discloses further bumpless transfer from the automatic mode into the manual mode in either a planned or emergency situation while also allowing bumpless transfer from the manual to automatic mode when deemed appropriate to the operation of the prime mover.

Also provided, is a circuit for automatically testing an overspeed condition in the manual mode and then returning automatically to a high speed stop (HSS) upon cessation of the overspeed test.

OBJECTS AND SUMMARY OF THE INVENTION

It is an object of the present invention to provide a reference signal circuit which is operable in an automatic, manual or memory mode of operation.

It is another object of the invention to provide for automatic bumpless transfer between the memory or automatic modes into the manual mode of operation.

It is a further object of the invention to provide an overspeed test capability with automatic return to a high speed stop at the completion of the overspeed test.

It is another object of the invention to provide an automatic tracking circuit which obviates the process of aligning the manual control to the automatic control prior to transfer from the automatic mode into the manual mode.

Other objects and advantages will become apparent from the following detailed description of the invention and the novel features will be particularly pointed out hereinafter in the claims.

The invention itself is an automatic tracking circuit which includes three modes of operation. The automatic mode passes an input signal to an output pin through a pair of normally closed switches. A first switch related to a signal memory function (memory mode) will substitute a last valid automatic signal for the input signal should the input signal be determined to be in error. A second switch related to the manual mode will input a manual signal in place of an automatic signal whenever it is desired to operate in the manual mode. An UP/DOWN counter is used to store either the automatic signal or the last valid automatic signal to enable bumpless transfer into the manual mode. A keyboard system is provided for incrementing and decrementing the UP/DOWN counter in the manual mode. The high speed stop is automatically injected as the control signal after an overspeed test.

BRIEF DESCRIPTION OF THE DRAWING

The drawing shows in schematic form the automatic tracking circuit according to the present invention including input and output pins, associated memory, storage, manual input circuitry and timing circuitry.

DETAILED DESCRIPTION OF THE INVENTION

The drawing shows an automatic tracking circuit 10 in accordance with the present invention. In general, the circuit includes a signal input pin 12 and a signal output pin 14. Other portions of the invention include a signal memory function or memory channel 16, a tracking channel 18, a keyboard or manual input section 20 and timing circuitry 22.

An automatic input signal is a customer-supplied signal which may provide a prime mover reference set point such as a speed set point to pin 12 in the automatic tracking circuit. For this reason, the invention in its preferred application is a reference signal circuit. However generically, the circuit in general may be described as an automatic tracking circuit. The input signal must be scaled to the range of the automatic tracking circuit and so a signal conditioner 24 is provided as shown. An electronic stop 26 limits the maximum and minimum input signal voltage within a range compatible with a high speed stop (HSS) and a low speed stop (LSS). An electronic stop 28 limits the output signal to a preselected output value determined by the operating system.

The conditioned input signal is input into an analog/digital converter 30 through a buffer amplifier 32. The A/D converter outputs twelve BIT digital words in accordance with its input and is updated at an 8 per second interval. One output of the A/D converter is input into a signal memory function (SMF) or memory channel 16 which includes shift register 34 updated twice per second and digital to analog converter 36. If during the course of automatic operation it is determined that the automatic input is faulty or disabled, the last valid output of the automatic signal input will be frozen at the output of the shift register while the SMF switch 38 will change position other than what is shown so that the output of the D/A converter will now become the reference signal appearing at pin 14 rather than the failed input at pin 12.

The output of A/D converter 30 is also input into a first select A or B circuit 40. Select circuit 40 is updated at a rate of 8 per second. The A input is the digital word corresponding to the automatic signal input whereas the B input is a digital word corresponding to the high speed stop (HSS). High speed stop may be the equivalent of the turbine rated speed. The A output equivalent to the automatic signal is normally passed through the first select circuit unless the auto tracking circuit is in the manual mode and an overspeed test is in progress at which point the HSS is selected.

The output of the first select circuit 40 is input into a second select A or B circuit 42 as the A input. The B input to select circuit 42 is the output of shift register 34 or under a signal interrupt condition the last valid signal from the signal memory function. Thus, select circuit 42 passes the current automatic signal under automatic operation, a memory signal or a last valid signal under conditions where the input signal is faulty; or, the HSS limit signal in the manual mode when an overspeed test is being conducted. The second select circuit 42 is updated 8 times per second. The word select to the first and second select circuits 40 and 42 respectively, is input on lines 44 and 46 connecting the respective circuits with the mode logic box 48 and control 50. Mode logic provides the digital word for automatic, manual or signal memory function (SMF) whereas the control logic provides the load signal to the timing circuit yet to be described.

The output of second A or B select circuit 42 is input into UP/DOWN counter 52. UP/DOWN counter 52 is motivated by the automatic input from the second select circuit or the manual input identified as U(UP) and D(DOWN). An OR circuit 54 provides a load signal to the UP/DOWN counter either at an 8 per second interval or when selected at an interval compatible with an overspeed test. A trip signal (T) to the UP/DOWN counter will reset the counter to zero.

The output of UP/DOWN counter 52 is input into digital to analog converter 56 to be translated into an analog voltage back into the main signal channel 58 connecting pins 12 and 14. This input is accomplished through auto-manual switch 60 where in the manual mode the switch is configured in a mode opposite to that which is shown.

The timing circuit indicated generally at 22 comprises a 32 HZ oscillator 70 connected to a delay circuit 72 and binary counter decoder circuit 74 all of which provide inputs into a 4:1 demultiplexer 76. Simply stated, timing pulses for the automatic circuit are derived from oscillator 70, stabilizer by delay circuit 72, translated by binary counter decoder 74 so that demultiplexer 76 may distribute the timing signals in accordance with system needs. Transfer signals to the analog/digital converter, the first and second select circuits and the UP/DOWN counters have an 8 per second interval whereas the timing signal to the shift register is at a 2 per second interval, the latter to enable the storage of a last valid signal in the memory function.

The manual input 20 may be by way of several pushbutton key arrangements as represented by a slow increase and decrease pushbutton 80, a fast increase/decrease pushbutton 82 and an overspeed (OS) test enable 84. One bit counter circuits I and D respectively provide discreet increase and decrease pulses respectively to UP and DOWN steering logics 86 and 88. In addition, an oscillator circuit 89 provides pulse trains to the respective steering logics in accordance with the desired direction of count for fast UP/DOWN count. Up stream in the respective UP and DOWN count signal paths are disable/enable circuits 90 and 92 which will disable the manual input in the automatic mode and enable the manual input in the manual mode. Inhibit signals all 1's or all 0's prevent the UP/DOWN counter from rolling over in the direction of either the ceiling or floor respectively. The 1 and 0 inhibit signals are derived from the output of the UP/DOWN counter through digital comparator circuits 94 and 96 as shown. A third digital comparator 100 determines if the UP/DOWN counter is at high speed stop (HSS). At HSS the UP steering logic is also put on inhibit unless overridden by a permissive from the overspeed (OS) test button. Arrival at HSS will enable a lamp 102 to indicate the event. The HSS is input in HSS set circuit 104.

Finally, in conjunction with the transition from manual mode to automatic operation, signal matching means such as a comparator circuit 106 is connected at the input side of the main signal channel. The comparator circuit 106 indicates a match between the automatic signal input and the manual signal prior to transfer to automatic operation at which time the manual/automatic relay 108 is enabled and manual automatic switch 60 resets to the position shown.

The reference signal circuit just described in its improved form may in a preferred embodiment be applied to an overall prime mover control system as shown in the aforementioned U.S. Pat. No. 4,025,762. There are, of course, alternative uses and signal inputs which might be combined with the present invention without departing from the scope thereof. For this reason, the circuit may be generically referred to as an auto-tracking circuit.

The circuit in accordance with the present invention includes three states of operation including automatic, manual and signal memory function. In addition, overspeed test is permitted and transfer from the automatic to manual mode is accomplished in an automatic and bumpless manner. Also, transfer from the manual to automatic mode is inhibited until the automatic and manual signals are matched.

Under normal conditions, the auto-tracking circuit receives a computer generated input signal representative of a desired condition or reference setpoint which is then automatically passed to the output pin through closed switches for auto-manual operation and signal memory function. The distinguishing feature of automatic operation is that the input signal is stored and regularly updated in the signal memory function or memory channel and also in the storage channel. A timing circuit provides a more rapid update of the storage channel than the memory channel so that a last valid signal may be saved in the memory channel should there be a failure in the reference input signal to the auto-tracking circuit.

Should there be a failure detected by the customer in the automatic computer generated reference signal, such failure will be communicated to the auto-tracking circuit mode logic which causes the signal memory function (SMF) switch to change state and thereby pass the stored last valid automatic signal to the main signal channel. This holds the controlled prime mover at the last valid reference signal unless overridden by a trip signal.

The next operational step would be to transfer from signal memory function to manual mode or simply from automatic mode to manual depending on the output of the second A or B select. The mode command to manual will cause the auto manual switch to change state and enter the output of the digital to analog circuit into the main signal channel. This output will be either the last valid reference signal if the immediate previous mode were the signal memory function or it will be the digital automatic signal if the switch is made from automatic to manual. Manual signals could then be entered into the UP/DOWN counter through the pushbutton keys either at a slow rate or fast rate.

If an overspeed test is desired, the overspeed test pushbutton will override the high speed stop inhibit and allow the reference signal appearing at the output of the UP/DOWN counter to exceed the HSS. When the overspeed test button is released, the UP/DOWN counter will automatically reset to the HSS because of the input through the first select A-B circuit. If during the overspeed test, the prime mover is tripped the reference circuit is reset to zero. The overspeed test permissive is operative only when pressed and in the manual mode.

In order to transfer from the manual mode to the automatic mode, the manual signal will need to be matched to the automatic signal. This may be done by incrementing or decrementing the manual input until a match occurs at which time the automatic/manual relay will pull the A/M switch into its automatic state.

While there is shown what is considered, at present, to be the preferred embodiment of the invention, other modifications may occur to those skilled in the art; and it is intended to cover in the appended claims all such modifications as fall within the true spirit and scope of the invention.

What is claimed is:

1. An automatic tracking circuit for selectively providing an output signal in accordance with an automatic signal input, a last valid automatic signal input or a manual signal input with bumpless transfer there between comprising:
    a main signal channel including an input pin electrically connected to an output pin through an auto-manual switch and a memory switch;
    an A/D converter for producing a digital word output which tracks the automatic signal input;
    a memory channel including a shift register and a first D/A converter connecting the A/D converter and the memory switch;
    a tracking channel including at least one signal select circuit connecting the A/D converter with an UP/DOWN counter;
    manual signal input means connected to the UP/DOWN counter; and,
    a second D/A converter connecting the output of the UP/DOWN counter to the auto-manual switch.

2. The circuit recited in claim 1 wherein the memory channel is updated less frequently than the tracking channel.

3. The circuit recited in claim 1 wherein the output of the shift register is an alternative input into the signal select circuit connected to the UP/DOWN counter.

4. The circuit recited in claim 1 wherein there are at least two signal select circuits including a first signal select circuit connected to the A/D converter and having an alternative input signal equal to a high speed stop; and,
    a second signal select circuit connected to the output of the first signal select circuit and having an alternative input signal corresponding to the last valid automatic signal.

5. The circuit recited in claim 4 further comprising:
    an overspeed test button providing a manual override of the high speed stop and wherein the UP/DOWN counter is reset to high speed stop through said first and second signal select circuits.

6. The circuit recited in claim 1 further comprising signal matching means for determining zero difference between the manual signal and the automatic signal; and, relay means connected to the signal matching means for automatically resetting the auto-manual switch.

7. An automatic tracking circuit for selectively providing an output signal in accordance with an automatic signal input, a last valid automatic signal input or a manual signal input with bumpless transfer there between comprising:
    a main signal channel including an input pin electrically connected to an output pin through an auto-manual switch and a memory switch;
    an A/D converter for producing a digital word output which tracks the automatic signal input;
    a memory channel including a shift register and a first D/A converter connecting the A/D converter and the memory switch;
    a tracking channel including first and second signal select circuits connecting the A/D converter with an UP/DOWN counter; said first signal select circuit having an alternate input equal to a high speed stop; said second signal select circuit having an alternate input equal to the output of the shift register;
    manual signal input means connected to the UP/DOWN counter; and,
    a second D/A converter connecting the output of the UP/DOWN counter to the auto-manual switch.

8. The circuit recited in claim 7 further comprising:
    an overspeed test button providing a manual override of the high speed stop and wherein the UP/DOWN counter is reset to high speed stop through said first and second signal select circuits.

9. The circuit recited in claim 7 further comprising signal matching means for determining zero difference between the manual signal and the automatic signal; and, relay means connected to the signal matching means for automatically resetting the auto-manual switch.

* * * * *